(No Model.)
D. LEBLANC.
SEED PLANTER.
No. 369,345. Patented Sept. 6, 1887.
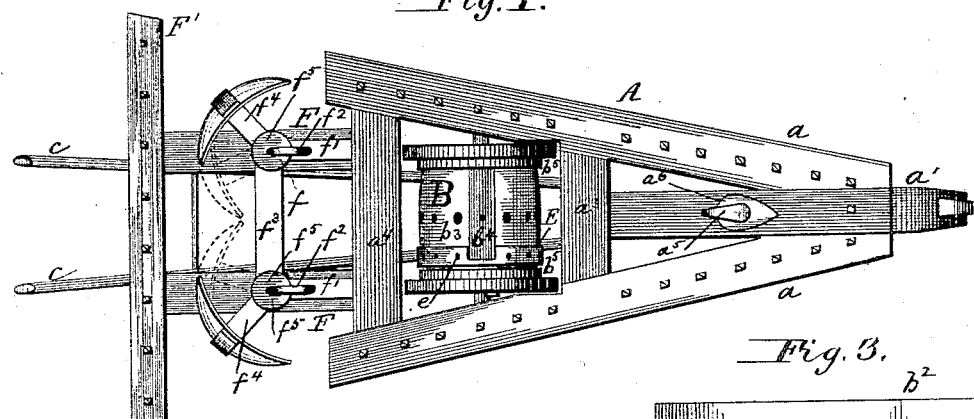
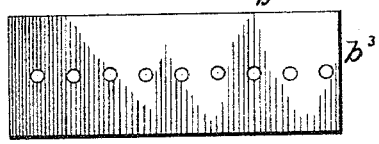
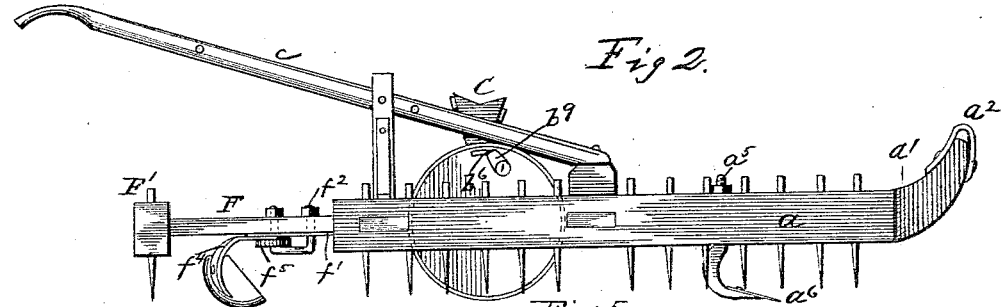
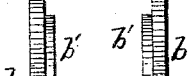
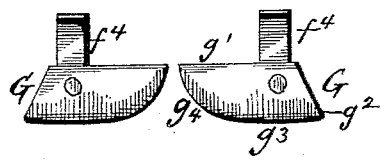
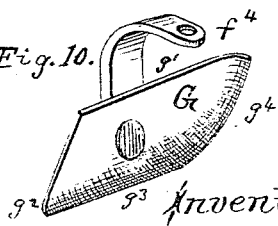
Witnesses:
B. C. Fenwick
Katie Parkhurst
Inventor:
Dolsey Leblanc
By John S. Duffie
His Attorney.

UNITED STATES PATENT OFFICE.

DOLSEY LEBLANC, OF ABBEVILLE, LOUISIANA.

SEED-PLANTER.

SPECIFICATION forming part of Letters Patent No. 369,345, dated September 6, 1887.

Application filed April 5, 1887. Serial No. 233,798. (No model.)

*To all whom it may concern:*

Be it known that I, DOLSEY LEBLANC, a citizen of the United States, residing at Abbeville, in the parish of Vermillion and State of Louisiana, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to seed-planters; and it consists in the novel construction and arrangement of its parts, as hereinafter fully described in the specification and set forth in the claims.

In the accompanying drawings, Figure 1 is a bottom plan view of my invention. Fig. 2 is an elevation of the same. Figs. 3, 4, 5, 6, 7, 8, and 9 are detail views. Fig. 10 is a detail view of one of the plows.

My invention is described as follows: A is the front part of the harrow-frame, and is V-shaped, the wider end being at the rear, and consists of the side beams, $a\ a$, which are secured to a tongue, $a'$, bearing on its front and upturned end a clevis-iron, $a^2$, and cross-beams $a^3\ a^4$ and harrow-teeth, which are secured equal distances apart in the side beams, $a$, and one in the tongue $a'$. A plow-standard, $a^5$, is secured in the said tongue about half-way between the cross-beam $a^3$ and the junction of the side beams, to the lower end of which is secured a plow or furrow-opener, $a^6$. Between the said side beams, $a\ a$, and the cross-beams $a^3\ a^4$ is journaled a seed-drum, B. This drum is for dropping the seed in the furrow that is formed by the said opener. This drum is so constructed that it will drop various kinds of seeds and at various distances apart. It is rotated by contact with the ground; but is so constructed that the dirt will not enter the dropping-holes, and consequently they will not become clogged.

The drum-heads $b$, Fig. 5, have their inner faces cut down some distance, forming necks $b'$, around which is secured the plate or band $b^2$, forming the central part of the receptacle. This plate has in its center a row of perforations, $b^3$, equal distances apart. This plate or band $b^2$ is so shaped that when secured as described the central part of the said drum is larger in circumference at the row of holes than at either end, to the end that the seed may gravitate to the said central holes. The said band $b^2$ does not entirely meet around said necks, but leaves a space through which the seed is put into the receptacle or drum, being directed in their course by the hopper C, between the handles $c$, immediately over said opening. Said opening is closed by a door, $b^4$, Fig. 7, hereinafter mentioned and described. When the said plate or band $b^2$ has been secured around the said necks, there is fastened around either end of the said band, to hold the same more securely in place, two bands, $b^5$, which also act as guards to hold the said door $b^4$ in place.

There is an opening, $b^6$, in one head of the drum, through which opening the said door or removable piece $b^4$ is passed in and under the bands $b^5$, its lower face resting on the peripheries of the necks $b'$. One half of the outer end of said door is cut away, forming a recess, $b^7$, Fig. 7, the other half extending out and being turned up to form a handle, $b^8$, by which the door may be withdrawn. The said door is held from slipping out by means of a latch, $b^9$, pivoted on the outer face of one of the drum-heads, which latch works against the depression $b^7$, and is arrested by coming in contact with the extension forming the handle $b^8$. The peripheries of these drum-heads $b$ extend out from the necks, forming flanges $d$, Fig. 5, which answer the purpose of wheels, and rotate the drum and bear the same up from the ground. These flanges or wheels are protected by tires $d'$. The said drum B is provided with a number of bands, E, having a row of dropping-holes $e$ along their center, which may be large or small, close together or wide apart, so that the drum can be adapted to dropping any size grain any distance apart. Only one of these bands is used at a time. In addition to the dropping-holes $e$ these bands have formed in one end a slot, $e'$, and to the other end is formed or secured a tongue of metal, $e^2$, adapted to be passed through the slot $e'$, and bent down to secure the band in place. I do not confine myself to this particular mode of securing the said bands in place, but may adopt any other considered convenient and practicable.

To the rear end of the frame A, and attached to the cross-beams $a^4$, are two beams, F, to the rear end of which is secured a third cross-beam, F', carrying a number of harrow-teeth or small plows, the object of which is to smooth the ground and more completely cover the seeds after the front harrow and the rear plows have passed over the furrow. The two beams F are perforated at the points $f$, from which perforation extend plates $f'$ to the cross-bar $a^4$, and are secured therein, their rear end having two perforations, through which the U-shaped bolts $f^2$ work. These two beams F are further connected together by a cross-plate, $f^3$, which rests under the plates $f'$, and has in its ends perforations, through which one end of the U-shaped bolts work. Under this cross-plate $f^3$ is pivoted two plow-standards, $f^4$, one under each beam. Under the ends of these plow-standards $f^4$ are washers $f^5$. The two ends of the U-shaped bolts are then passed through these pieces, the rear ends passing through the washers $f^5$, plow-standards $f^4$, and through the perforations in the cross-plate $f^3$, and through the rear perforations in the plates $f'$, and the other ends through the front perforations, and both ends are secured by nuts. This makes a strong and durable fastening and bed for the pivoted ends of the said plow-standards to work in. These plow-standards $f^4$ bear on their lower ends plows G for covering the seeds. These plows are peculiarly adapted to the work for which they are designed, and, being exactly alike, the description of one is sufficient. The upper edge, $g'$, is perfectly straight. The outer end, $g^2$, is cut at an angle, the lower corner extending outward. The lower edge, $g^3$, is straight for a short distance and then curves upward in an almost perfect circle, forming the inner end, $g^4$. Said plows have their lower edges and inner ends dished forward, as shown in Fig. 10. These two plows are secured to the lower ends of the arms with their curved ends inward, and the said arms and plows are so arranged that they may be brought together, as seen by the dotted lines, Fig. 1, in which case they will cover the seed quite deep, and they may be adjusted in width more or less, as seen in the said figure, until they will scarcely throw any dirt on the seed at all. This arrangement is quite advantageous, as it enables me to adapt the seed-planter to the various conditions of the soil and to the various soils. These plows of course have their lower edges dished forward, as is usual.

Having described my invention, what I claim as new, and desire to secure by Letters Patent, is—

1. In the drum B of a seed-planter, as described, the door or removable piece $b^4$, having the recess $b^7$, the upturned handle $b^8$, latch $b^9$, and bands $b^5$, holding the band $b^2$ and said door or removable piece in place, substantially as shown and described.

2. In a seed-planter, as described, the combination of the beams F, perforated plates $f'$, secured to the lower face of said beams and in the cross-beam $a^4$, perforated cross-plate $f^3$, plow-standards $f^4$, washers $f^5$, the U-shaped bolts $f^2$, passing upward, their front ends through plates $f'$ and beams F, their rear ends through said washers, plow-standards, cross-plates $f^3$ and $f'$, and said beams F, substantially as shown and described.

3. In a seed-planter, as described, the dished plows G, having their upper edge straight, their outer end cut at an angle outward, their lower edge commencing on a straight line and terminating in an almost perfect circle forming the inner ends of said plows, substantially as shown.

In testimony whereof I affix my signature in presence of two witnesses.

DOLSEY LEBLANC.

Witnesses:
O. H. O'BRYAN,
ALCIDE LEBLANC.